US010592858B2

(12) United States Patent
Subramanian (10) Patent No.: US 10,592,858 B2
(45) Date of Patent: Mar. 17, 2020

(54) SYSTEM AND METHOD OF JUST-IN-TIME REVERSE LOGISTICS MANAGEMENT (71) Applicant: Rent the Runway, Inc., New York, NY (US)

(72) Inventor: Vijay Subramanian, New York, NY (US)

(73) Assignee: Rent The Runway, Inc., New York, NY (US)

( * ) Notice: Subject to any disclaimer, the term of this patent is extended or adjusted under 35 U.S.C. 154(b) by 349 days.

(21) Appl. No.: 15/588,174

(22) Filed: May 5, 2017

(65) Prior Publication Data
US 2017/0323264 A1 Nov. 9, 2017

Related U.S. Application Data (60) Provisional application No. 62/332,298, filed on May 5, 2016.

(51) Int. Cl.
G06Q 30/06 (2012.01)
G06Q 10/08 (2012.01)
G06Q 10/00 (2012.01)
G07F 7/00 (2006.01)

(52) U.S. Cl.
CPC ........... *G06Q 10/087* (2013.01); *G06Q 10/08* (2013.01); *G06Q 10/083* (2013.01); *G06Q 10/0875* (2013.01); *G06Q 10/20* (2013.01); *G06Q 10/30* (2013.01); *G06Q 30/0635* (2013.01); *G07F 7/00* (2013.01); *G06Q 30/0645* (2013.01)

(58) Field of Classification Search
CPC ...... G06Q 10/087; G06Q 10/30; G06Q 10/08; G06Q 10/0875; G06Q 10/20; G06Q 30/0635; G06Q 30/06; G06Q 10/083; G06Q 30/0645
USPC .................................. 705/26.1, 28, 29, 340
See application file for complete search history.

(56) References Cited

U.S. PATENT DOCUMENTS 7,848,968 B1 * 12/2010 Hareng .................. G06Q 10/00
705/28
10,083,416 B2 * 9/2018 Del Rosario ........ G06Q 10/087
(Continued)

FOREIGN PATENT DOCUMENTS

JP 2002-073902 A 3/2002
JP 2002-109155 A 4/2002
(Continued)

OTHER PUBLICATIONS

"How Warehouse Analytics Empowers Warehouse Management Time for seamless integration with demand planning, fulfillment and TMS. By Elliot Maras"; 2015; Published in Food Logistics, (163), 42-47. Retrieved from Dialog on Nov. 22, 2019.*
(Continued)

*Primary Examiner* — Yogesh C Garg
(74) *Attorney, Agent, or Firm* — Perkins Coie LLP (57) ABSTRACT A system and method for just in-time reverse logistics management directed to receiving one or more product orders associated with one or more individual SKU's; tracking one or more products SKU's through a cyclical product lifecycle, matching a product order with a product in the cyclical product lifecycle; assembly the product order based on the priority hierarchy; and shipping the product order based on the priority hierarchy.

20 Claims, 6 Drawing Sheets (56) References Cited

U.S. PATENT DOCUMENTS

| | | | |
|---|---|---|---|
| 2004/0039658 A1* | 2/2004 | Hume | G06Q 10/06 705/26.1 |
| 2004/0093287 A1 | 5/2004 | Gupta et al. | |
| 2004/0193438 A1* | 9/2004 | Stashluk, Jr. | G06Q 10/08 705/304 |
| 2007/0150383 A1* | 6/2007 | Shakes | G06Q 10/087 705/29 |
| 2007/0156439 A1* | 7/2007 | Fyda | G06Q 10/06 705/308 |
| 2011/0106584 A1* | 5/2011 | Borthwick | G06Q 30/02 705/7.31 |
| 2013/0197959 A1* | 8/2013 | Gupta | G06Q 30/0645 705/7.23 |
| 2013/0218784 A1 | 8/2013 | Alonzo et al. | |
| 2014/0351098 A1* | 11/2014 | Shafer | G06Q 10/087 705/28 |
| 2015/0262115 A1* | 9/2015 | Meulenberg | G06Q 10/087 705/7.15 |
| 2017/0004567 A1* | 1/2017 | Dutt | G06Q 30/0643 |

FOREIGN PATENT DOCUMENTS

| | | | | |
|---|---|---|---|---|
| JP | 2003-141244 A | | 5/2003 | |
| JP | 2004-444802 | * | 5/2004 | G60F 17/80 |

OTHER PUBLICATIONS

International Search Report and Written Opinion Issued in PCT Application No. PCT/US2017/031359, dated May 5, 2017, 14 Pages.

* cited by examiner

SYSTEM AND METHOD OF JUST-IN-TIME REVERSE LOGISTICS MANAGEMENT

FIELD

The present invention relates to reverse logistics management systems and more particularly to cyclical product lifecycle management systems for reusable items, such as items in a rental inventory.

BACKGROUND

Reverse logistics refers to operations related to the reuse of products and materials and has been described as the process of moving goods from their typical final destination for the purpose of capturing value, or proper disposal. Remanufacturing and refurbishing activities also may be included in the definition of reverse logistics. Growing green concerns and advancement of green supply chain management concepts and practices have brought greater attention to reverse logistics. The reverse logistics process includes the management and the sale of surplus as well as returned equipment and machines from the hardware leasing business. Normally, logistics deal with events that bring the product towards the customer. In the case of reverse logistics, the resource goes at least one step back in the supply chain. For instance, goods move from the customer to the distributor or to the manufacturer.

When a manufacturer's or supplier's product normally moves through the supply chain network, it is to reach the distributor or customer. Any process or management after the sale of the product involves reverse logistics. If the product is defective, the customer would return the product. The manufacturing firm would then have to organize shipping of the defective product, testing the product, dismantling, repairing, recycling or disposing the product. The product would travel in reverse through the supply chain network in order to retain any use from the defective product. The logistics for such matters is reverse logistics.

Current reverse inventory management systems (that is inventory management systems designed to handle product returns and restocking are cumbersome and not streamlined to return inventory to the stock system in as little time as possible. Nor do current reverse inventory management systems prioritize returned items based on an order of the returned items. Additionally, current systems do not account for inspection, cleaning and maintenance of returned items. This is because most reverse inventory management systems are designed to accommodate defective products or returns, wherein the focus of the business is a final sale of the inventory or transfer of returned merchandise to a seconds or outlet distributor.

It would be desirable for a reverse inventory management system to capture and prioritize all aspects of a business focused on a reverse logistics cycle, such a product rental business.

SUMMARY

Example embodiments of the inventions herein include a method of cyclical inventory management comprising the steps of first receiving one or more product orders associated with one or more individual SKUs; then tracking one or more product SKUs through a cyclical product lifecycle, wherein the cyclical product lifecycle comprises: receiving a returned product associated with an individual SKU; presorting the returned product based on a priority hierarchy; performing maintenance on the returned product; restocking the returned product for future sale; then assembling the product order based on the priority hierarchy; and finally shipping the product order based on the priority hierarchy.

In another example embodiment of the invention products within a cyclical product lifecycle are assigned a priority hierarchy including a weighting factor based on requirements to fill a product order including: date of required delivery, days required for shipment, product inventory availability, expected return date from previous sale, availability of alternative products, customer membership category, customer event type.

In some example embodiments of the invention the cyclical product lifecycle comprises: receiving a returned product associated with an individual SKU; presorting the returned product based on a priority hierarchy; pre-inspecting the returned product for maintenance; cleaning the product; steaming or ironing the product; inspecting the product for quality control; repairing the product; restocking the returned product for future sale, and recording the step of the product lifecycle at which the product resides.

Other example embodiments of the invention may include one more of the following features. The method may further comprise providing an estimation of time until the product is restocked for future sale. The method further includes assembly of the product order based on a priority hierarchy that includes selecting a product from restocked inventory or selecting the product from the cyclical product lifecycle before restocking of the product, and may further comprise calculating preferred shipping dates based on one or more factors comprising: product availability; least expensive shipping date; first available shipping date, last possible shipping date; bundling of orders; requested receipt date or receipt time. The method may also include indicating on a display the status of a product in the cyclical product lifecycle, indicating the status of an order fulfillment, indicating the status of shipment or delivery. In some embodiments, the method may also comprise recalculating the priority hierarchy based on a change in the cyclical product lifecycle, product availability, or competing orders. In some such embodiments, recalculation of the priority hierarchy is performed for all products in the product lifecycle simultaneously. In some embodiments, the product sale is a rental sale.

In still another example embodiment of the invention, a system for cyclical product lifecycle management comprises: an order management module configured to receive one or more product orders, wherein each product is associated with an individual SKU, and providing order information to the system; a product lifecycle module configured to track a product associated with an individual SKU through a cyclical product lifecycle, wherein the cyclical product lifecycle comprises; receiving a returned product associated with an individual SKU; presorting the returned product based on a priority hierarchy; performing maintenance on the returned product; inspecting the returned product; restocking the returned product for future sale; a priority hierarchy module configured for assigning priority status to products in the cyclical lifecycle based on product order information, wherein the priority hierarchy includes one or more order weighting factors comprising: date of required delivery, days required for shipment, product inventory availability, expected return date from previous sale, availability of alternative products, customer membership category, customer event type; and a fulfillment module for matching a product order information with restocked or otherwise available products for fulfilling product orders.

In a further example embodiment of the invention, one or more of the following features may be included. The priority hierarchy module recalculates product priority for all products in the system based on state changes in the cyclical product lifecycle and/or new product orders. The priority hierarchy module recalculates product priority for a chain of products associated with a state change in the product lifecycle or new product orders. The cyclical product lifecycle comprises: receiving a returned product associated with an individual SKU; presorting the returned product based on a priority hierarchy; pre-inspecting the returned product for maintenance; cleaning the product; steaming or ironing the product; inspecting the product for quality control; repairing the product; and restocking the returned product for future sale. An indication is provided on a display as to the priority and status of a product order and/or product position within the product lifecycle. An order priority and/or product status are indicated based on a color scheme on a display. The priority hierarchy recalculates the priority of an order and/or product based on a state change to any product in the system and the displayed priority and status of an order and/or product is refreshed with after the recalculation. The fulfillment module records and/or calculates critical dates including preferred shipping dates based on one or more factors comprising: product availability; least expensive shipping date; first available shipping date, last possible shipping date; bundling of orders; requested receipt date or receipt time. Product fulfillment is shipment for a rental sale.

In still a further example implementation of the present invention, a computer implemented method of cyclical inventory prioritization comprises a process within a customer order module including receiving a first customer order for a first individual product; receiving from an inventory management module an indication of inventory availability for the first individual product; calculating an order priority code for the first customer order, wherein the priority code is determined based on one or more of the following weighted categories: date of inventory availability, required inventory return processing time, required delivery date, shipping time, last possible ship date, earliest possible ship date, least expensive ship date; shipping cost, customer membership level, inventory category, inventory availability, or order history; assigning an order priority code to the first customer order, wherein the priority code determines which order takes precedent over another order for processing; and indicating on a user display a list of two or more customer orders, each order having a priority code.

And in yet a further example implementation of the present invention the computer implemented method further comprises a process within the customer order module including receiving a second customer order for a second individual product; receiving from an inventory management module an indication of inventory availability for the second individual product;

calculating an order priority code to the second customer order, comparing the order priority code for the second customer order with the order priority code for the first customer order; recalculating the first and second order priority codes for the first and second customer orders, wherein the recalculation determines whether the first or second customer order has a higher priority based; assigning an order priority to the first and second customer orders based on the recalculation of priority codes; and displaying on a user interface the first and second customer orders with recalculated order priorities.

Example implementations of the present invention may include one or more of the following features. The second customer order has a higher priority than the first customer order. Calculating a priority code includes a determination of whether a same day turnaround is required; and if determined that a same day turnaround is required, assigning the highest priority to such customer order. The first and second prioritized customer orders are displayed on two or more user interfaces, the user interfaces being part of a product processing system including a user interface at two or more of the following product processing stations; product receiving; product maintenance; product storage; order assembly; order shipping. The first and second prioritized customer orders are displayed on two or more user interfaces, at least one of the user interfaces is associated with a product maintenance station in a product processing system, the product maintenance station comprising an inspection station, a spot cleaning station, a cleaning station, a pressing station, or a repair station.

Additional example embodiments of the present invention may further include one or more of the following features. The inventory management module calculates inventory availability based on one or more of the following categories; product in storage; product with customer; product in delivery to customer; product in delivery from customer; product returned but not processed; product in processing; product in need of repair; product in repair; product not available; product lost; product not received on expected date; expected date of return; expected completion of product processing; availability of related products. The product availability changes after calculation of the first of second customer order priorities; and further comprising, upon indication of a product availability change, recalculation of the first and second product order priorities, and display of the recalculated first and second order priorities. The inventory management module receives an input from a user interface indicating the product availability, the user interface being part of a product processing system including a user interface at one of the following product processing stations; product receiving; product maintenance; product storage; order assembly; order shipping. The product maintenance station comprising an inspection station, a spot cleaning station, a cleaning station, a pressing station, or a repair station. The inventory management system is a status input. The input to the inventory management system represents a change to the product availability.

In another example implementation of the present invention, an input indicating a change to the product availability causes the inventor management module to recalculate product availability and send the new product availability to the order processing module; wherein the order processing module upon receipt of a change in product availability, recalculates the priority of the first and second customer orders.

A further example implementation of the present invention includes a system for processing cyclical customer orders comprising one or more user terminals connected via a network to a processor, each user terminal having a user interface comprising a display and an input, wherein the one or more user terminals are associated with a product processing station. The system also comprises a server connected to the one or more user terminals, the server comprising: an inventory management module configured to calculate inventory availability based on one or more of the following weighted categories; product in storage; product with customer; product in delivery to customer; product in delivery from customer; product returned but not processed; product in processing; product in need of repair, product in repair; product not available; product lost; product not received on expected date; expected date of return; expected completion of product processing; availability of related products. The server also comprises a customer order module configured to receive a first customer order for a first individual product; receive from an inventory management module an indication of inventory availability for the first individual product; calculate an order priority code for the first customer order, the priority code is determined based on one or more of the following weighted categories, date of inventory availability, required inventory return processing time, required delivery date, shipping time, last possible ship date, earliest possible ship date, least expensive ship date; shipping cost, customer membership level, inventory category, inventory availability, or order history; assign an order priority code to the first customer order, wherein the priority code determines which order takes precedent over another order for processing; and cause an indication of the product order priority on the user display.

In additional example implementations of the present invention may include one or more of the following features. The customer order module is further configured to receive a second customer order for a second individual product; receive from the inventory management module an indication of inventory availability for the second individual product; calculate an order priority code for the second customer order, compare the order priority code for the second customer order with the order priority code for the first customer order; recalculate the first and second order priority codes for the first and second customer orders, wherein the recalculation determines whether the first or second customer order has a higher priority based; assign an order priority to the first and second customer orders based on the recalculation of priority codes; and cause an indication of the first and second product orders' priority on the user display. The product processing station comprises on or more of the following stations; product receiving; product maintenance; product storage; order assembly; order shipping. The product maintenance station comprises one or more of the following stations; an inspection station, a spot cleaning station, a cleaning station, a pressing station, or a repair station. The inventory management module is configured to receiving an input from the user interface indicating a change in the inventory availability, and wherein the inventory management module is further configured to recalculate the inventory availability based on the input. The customer order module is configured to receive a change in inventory availability from the inventory management module and recalculate customer order priority based in part on the change in inventory availability. The user display is configured to display multiple customer orders, each order having a priority code assigned. The user display is configured to display a change in multiple customer orders, wherein the change may include an addition or deletion of a customer order, or a change in priority of a customer order.

Example embodiments of the present invention may benefit from one or more of the following advantages. Real time mapping between dynamic state changes and order priority are possible. Product status throughout the sale/rental lifecycle can be tracked and mapped to future orders. Product inventory, durability, and sales data can be mapped to product lifecycle stages. Order priority, including same day turnaround of products to fill high priority orders, may be calculated and recalculated based on a variety of weighted factors including inventory availability and order fulfillment date.

DETAILED DESCRIPTION

Figure 1:
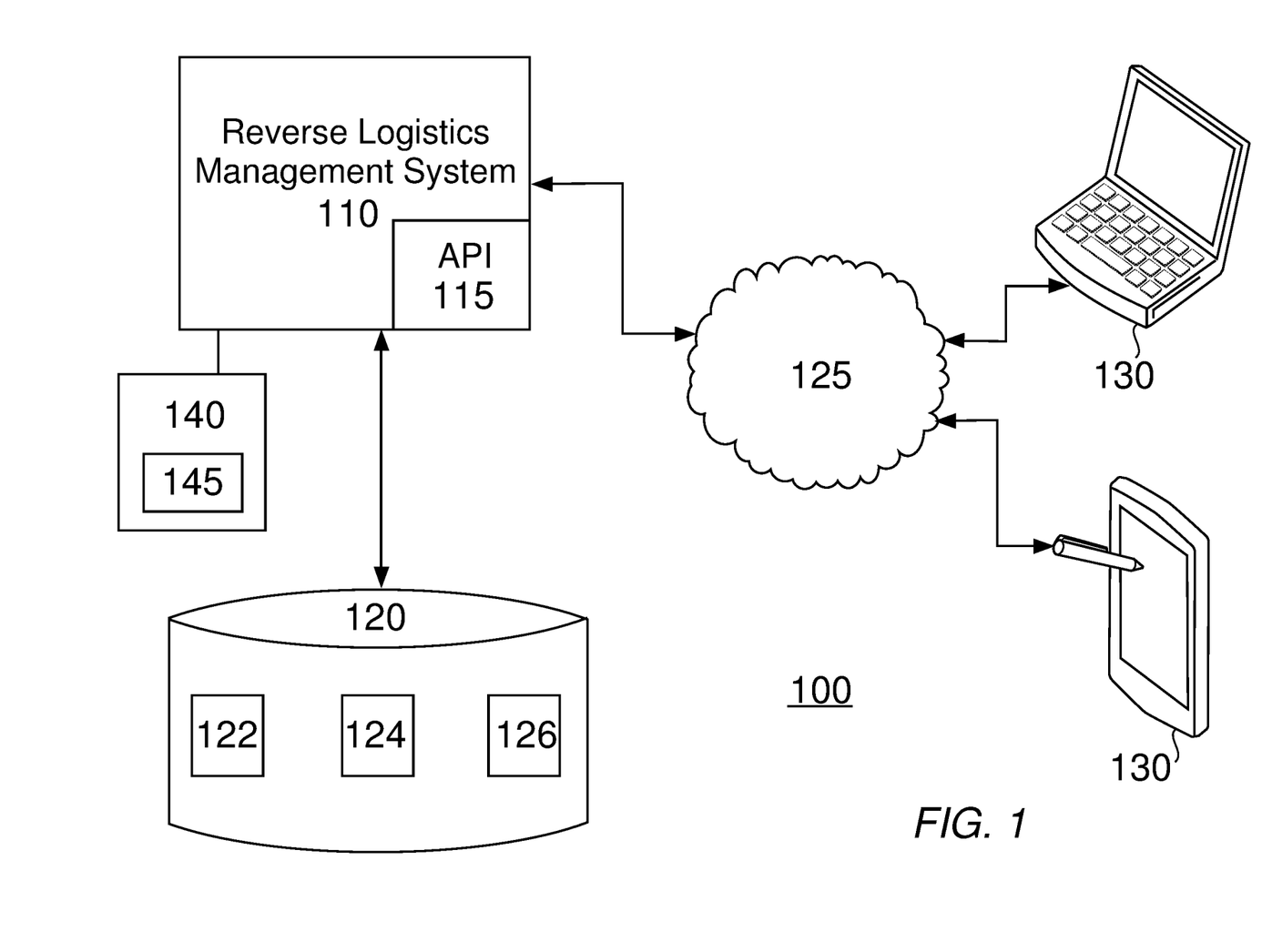
FIG. 1 is a system diagram showing an example environment of the present invention.

FIG. 1 is a block diagram illustrating a suitable computing environment for managing cyclical product lifecycles such as just-in-time reverse logistics systems. The computing environment 100 includes a cyclical lifecycle management system 110 or other just-in-time reverse logistics management system, which provides an Application Programming Interface (API) service 115 and/or via deployable software (local or cloud-based) configured to enable users, customers, enterprise systems, and so on, to access various different logistics and lifecycle management functions provided by the just-in-time reverse logistics management system 110. For example, a user at a computing device 130 (such as a desktop computer, mobile device, laptop, and so on) may upload, over a network 125 (e.g., a closed network, local area network, private network, public network, or the Internet), such as via an application or other content or information 140 associated with the just-in-time reverse logistics management system 110. In some embodiments the reverse logistics management system 110 may communicate with other computer systems instead of one or more end user terminals.

The content or logistics information 140 associated with the reverse logistics management system 110 may contain various different scripts or modules, such as a JavaScript module 145, that facilitate communicating over the network 125 to the transaction management system 110 (e.g., calling the API 115), in order to access and retrieve certain information associated with the reverse logistics management system 110, such as product information, order information, product processing information, shipping information, customer information, or other logistics information. The reverse logistics management system 110 may store such information via in various databases or memory, either local to the system or in various cloud-based storage services.

For example, a database 120 may include product information 122 associated with products in inventory or the state of the product through the cyclical lifecycle, such as shipping dates, priority information, maintenance and cleaning, order matching, and other logistics information. The database 120 may also include customer data or information 124, such as customer preferences, previous order information, customer subscription levels, marketing information, payment history and the like.

The database 120 may include other types of data or information 126, such as user information (e.g., information associated users within the logistics system), payment information (e.g., information associated with monetary exchanges between customers and the logistics system owner), and so on.

Further details regarding the components and methods performed by the reverse logistics management system 110 are described herein.

Figure 2:
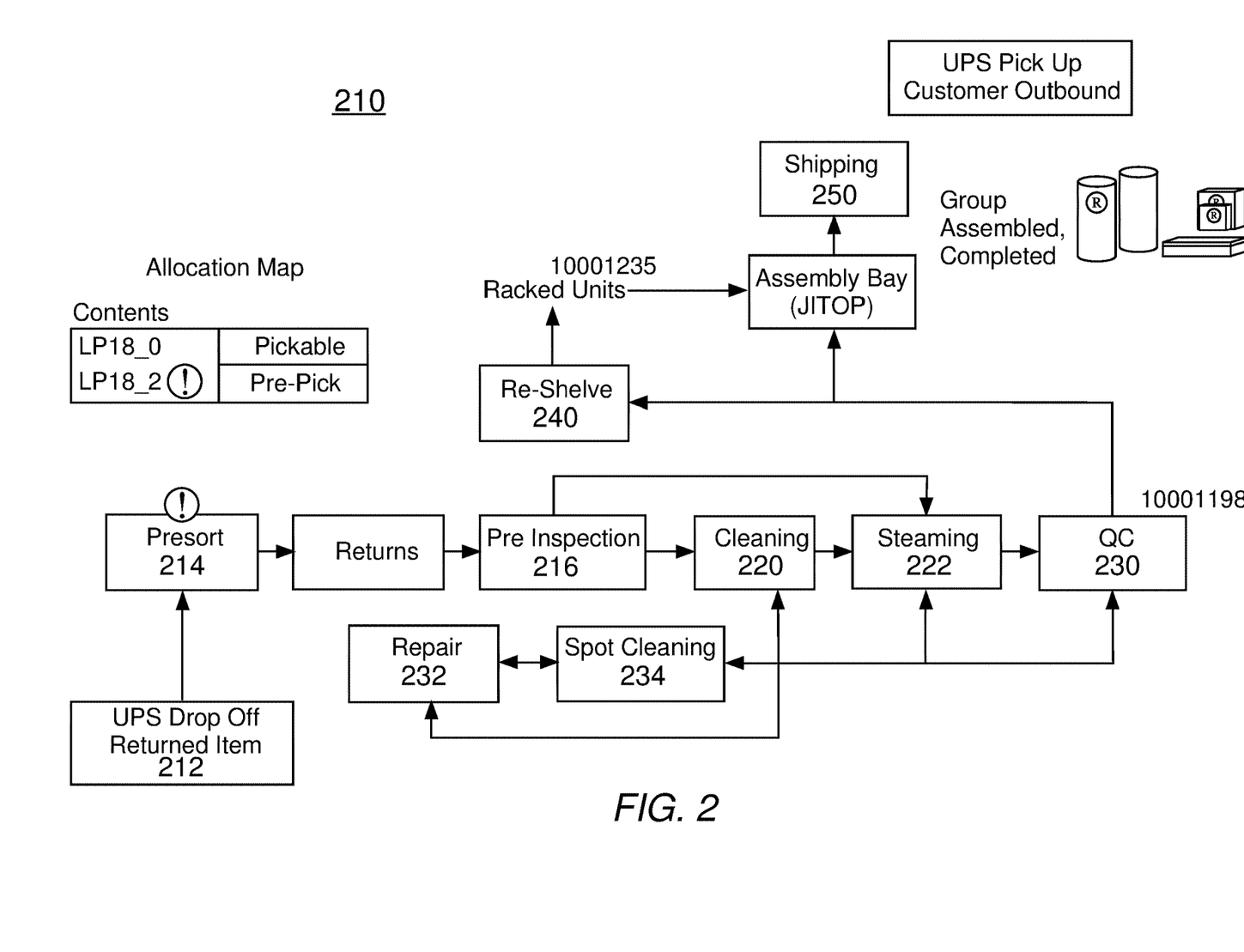
FIG. 2 is a flowchart of an example of the present invention.

FIG. 2 depicts a flowchart illustrating a reverse logistics process 210 consistent with example embodiments of the present invention. As depicted a just-in-time reverse logistics process 210 comprises the steps of a courier or shipping agency drop off 212 of returned product(s) or item(s). The products are then presorted 214 according to identified priority, e.g., items that have pending orders requiring the returned product be re-shelved and redistributed are processed before items that do not have an existing subsequent order. After presorting 214, the items are processed as returns and undergo a pre-inspection 216 wherein a determination is made as to what level of maintenance or cleaning is needed for the product to be restocked. The returned product may then proceed to cleaning 220, and or steaming 222. The returned product then undergoes a quality control inspection 230. The product can be sent for repair 232, spot cleaning 234, additional cleaning or laundering 220, additional steaming or pressing 222, and back to quality control inspection 230. Once passing quality control inspection 230 the product can be reshelved 240 or sent to package assembly 250. After package assembly 250 the returned product is ready for another sale or rental as the case may be.

One aspect of a just-in-time reverse logistics system is knowing information about orders relating to anticipated returned products. That is, a dynamic pool of product orders and a dynamic pool of returned product status must be constantly updated.

In some embodiments a reservation calendar or other smart booking platform may provide information relating to future orders for products in a cyclical lifecycle. A cyclical lifecycle may include products in rental inventory wherein the product is sold, used by the consumer for a specified time, and returned to be added to the rental inventory again. Dynamic inventory positions and reservations relating to specific SKUs may be tracked to estimate inventory availability for future dates. For example, reservations may be made days, weeks, or months in advance for specific items in a rental inventory. But while the reservation is pending the specific item may be rented multiple times to other customers. The inventory positions may be calculated on a continual basis to track and determine the state of the item on reservation. That is, any changes to the state of the item, or similar items that may fill an order must be tracked to ensure inventory is available to meet the order. Late returns, maintenance, and delays in processing can impact the material state of the inventory.

An inventory may be represented as N number of total items of a specific product in inventory and N may equal X, the expected number of simultaneous orders plus a buffering factor of Y. As such, the total number of items in stock equals a percentage more than the total expected simultaneous orders. Simultaneous orders are any order sequence when an item is unavailable for order fulfillment because it is with a customer, in shipping or transit, or in return processing waiting to be reshelved. The buffer may be influenced by product durability, successful return rate, seasonal preferences, designer popularity, price, or any other aspect that may influence the possibility that the average number of orders may fluctuate from a norm or that the inventory availability may fluctuate from a norm.

By overlaying and mapping in real-time all reservations against all inventory in the cyclical lifecycle, determinations are made as to the expected inventory availability to meet a future order. The mapping is recalculated anytime a material change is made to any inventory item. This material change or state change may include: delayed return of the item from a customer, damage or needed repair beyond ordinary cleaning or ordinary maintenance, return of unopened items thereby obviating the need for cleaning, new orders for items, group or bulk orders for items, urgent orders for items, extended time frame shipping requirements for ordered items, or any other factor that may impact the date upon which an item is returned, processed, and ready for additional sale.

The example just-in-time reverse logistics system in this disclosure may also assign priority codes using a priority hierarchy. Multiple factors may be considered to assign a priority to a returned item. For example, if the returned item has a pending future order the returned item may receive a high weighting factor to ensure it is processed first. Other factors for the priority hierarchy may include expected shipping times, expected processing times, location of future shipments, required delivery date, required delivery time, ability to process to meet least expensive shipping date, ability to process to meet last possible shipping date, relation to other orders, customer subscription level, customer loyalty level, the actual item or product returned and/or ordered, or any other custom priority category to be considered in ranking returned products for processing and shipping. Providing a priority hierarchy allows an item returned to be processed ahead of other items, for example processed for a same day turn around, and an order requiring that item to be immediately filled. This prevents returned items with a lower priority from interfering with the processing of higher priority items.

Through mapping of dynamic orders with dynamic inventory status, a minimal excess inventory level may be calculated to ensure future orders of products in a cyclical lifecycle are met without carrying unneeded inventory. For example in maintaining inventory N, which equals the average orders X plus a buffer Y, the buffer may be minimized to prevent carrying excess inventory N.

With reference to FIG. 2, and considering an example relating to the rental clothing market, a courier or shipping company may drop off 212 a returned clothing item, such as a ball gown. The returned gown is presorted 214 along with all other returned products. The presorting may be done by bar code scanning of the returned packaging or the actual returned products. The presorting may assign a priority ranking in the just in-time reverse logistics system such that returned items that do not have a pending future order are given a lower priority. Similarly, items with the closest future order delivery date may be given a higher priority than items with a future order date that is later. For the purpose of the present example, we assume the ball gown is returned on Day 1 and delivery for the next order must be completed by day 7. Considering return processing and shipping time, the returned ball gown is given a high initial priority.

After presorting 214, the returned ball gown undergoes a pre-inspection 216 and a determination is made as to what level of maintenance or cleaning is needed for the product to be restocked. For example, if the ball gown is returned unopened, the gown does not require dry cleaning 220, and may proceed immediately to steaming/pressing 222. Should the ball gown be returned having been used, the gown can be sent to cleaning 220 and steaming/pressing 222. Again, based on a priority code assigned to the gown upon presorting, the gown may proceed through cleaning 220 and steaming/pressing 222 before other returned products.

Assuming the gown is not damaged or does not have stains, or require specific spot cleaning, the gown theoretically should be ready for restocking and a subsequent sale/rental. A quality control inspection ensures this. And in our example the ball gown would then undergo a quality control inspection 230. The gown can be sent for repair 232, spot cleaning 234, additional cleaning or laundering 220, additional steaming or pressing 222, and back to quality control inspection 230. Once passing quality control inspection 230 the gown can be re-shelved 240 or sent to package assembly 250. After package assembly 250 the returned product is ready for shipping and the cyclical lifecycle starts all over.

The just-in-time reverse logistics system 110 of the present disclosure is able to track each step of the return process described herein as well as the location at any point in the cyclical lifecycle, be that with a customer, in shipping for return, delivered for return, preprocessing, inspection, cleaning, steaming, quality control inspection, repair or maintenance, restocking, order assembly, shipping for delivery to customer, or again with the customer. Moreover, the system 110 of the present disclosure may calculate expected time to complete the cycle or at any point in the cycle and reassign a priority rank depending on when and where the product is needed to meet a subsequent order.

Moreover, because the system 110 of the present invention is able to track each individual product through each step of the cyclical lifecycle, data can be gathered as to the durability of particular products. For example, one item of clothing may consistently require multiple cleanings or may need repair after each return. This data can be gathered to inform future purchases, ensure a sufficient excess of inventory is available, or educate inspectors working with the product through the return process.

Figure 3:
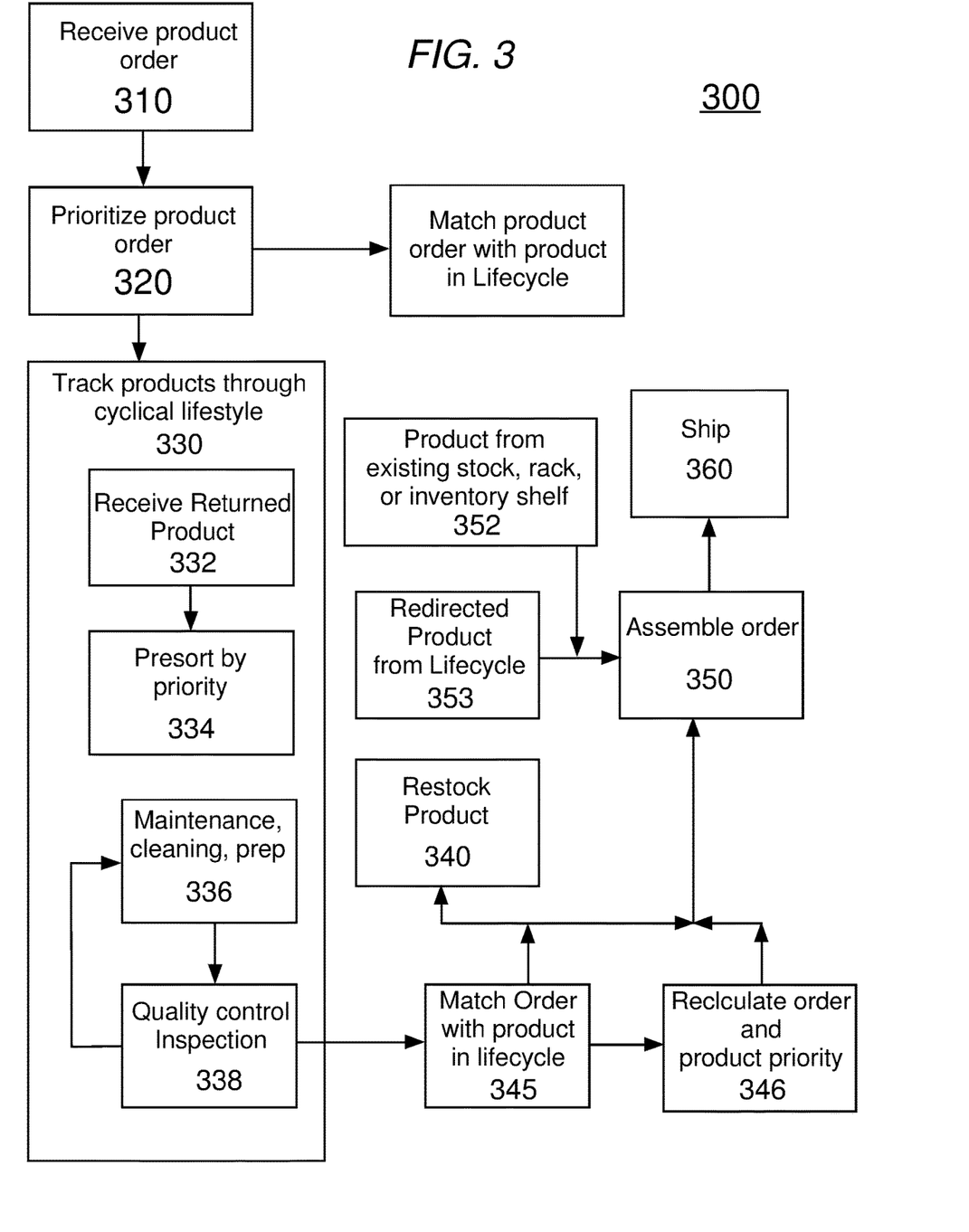
FIG. 3 is a flowchart of an example of the present invention.

FIG. 3 is a flowchart of an example method 300 of the present disclosure. As depicted, a cyclical product lifecycle inventory management method 300 includes receiving an order 310 for one or more products, wherein each product has a specific SKU. The order may specify the exact product by style, color, size, model number, age, etc. The order may also include a desired delivery date and time. Based on the order parameters, a prioritization code 320 may associated with the order such that a product upon return may be identified by a specific SKU to match the order for fulfillment and shipping. The method 300 track tracks actual individual products 330 through the cyclical lifecycle and records when the product is received as a return 332 from a customer, presorts 334 the returned product by whether the product has been matched with a future order 345, orders the returned product by priority for maintenance, cleaning, and product preparation 336, and then can send the product to quality inspection 338. At quality inspection, the product may be sent back to maintenance, cleaning, and preparation 336. This may add to the time that the product would otherwise be available for fulfillment of the next product order. In this case, the method 300 recalculates the priority of all products in the system to ensure the order received at 310 is filled on time. If need be, the system can rematch the order form 310 with existing stock 352, or even another product that is ahead of the current returned product in the cyclical lifecycle. Assuming the returned product passes the quality inspection 338, the returned product may be restocked 340 for future order fulfillment, matched with the existing order 345, reassigned to a different order 346, and/or sent to order assembly 352. At order assembly 352, the product is paired with any other products required to fill the entire order, e.g., a gown is matched with shoes and an overcoat. Once the order is fully assembled 350, the products are shipped 360 to the customer. The customer may receive return instructions and packaging for the return. The method 300 recalculates the availability of the product for the next product lifecycle based on expected return dates and anticipated processing times.

In some examples, more than one product may be shipped to fill an order. For example, the order may request a size 10 and a second item in either next smaller or next larger size may be shipped along with the product matching the specific order.

In some examples, the priority assigned to the order and the product to match the order is determined using one or more priority weighting factors, which may include: date of required delivery, days required for shipment, product inventory availability, expected return date from previous sale, availability of alternative products, customer membership category, customer event type; earliest possible shipping date, least expensive shipping date, last possible shipping date; or any other assigned or derived factor that may have a material impact of the product being received by the customer at the required time and place.

In some examples of the disclosure herein, the tracking of the cyclical lifestyle may comprise tracking a returned product through one or more of the following steps: receiving a returned product associated with an individual SKU; presorting the returned product based on a priority hierarchy; pre-inspecting the returned product for maintenance; cleaning the product; steaming or ironing the product; inspecting the product for quality control; repairing the product; restocking the returned product for future sale. The method may include recording when the product is at each step in the cyclical lifecycle and deriving data and information relating to the time and effort required for a specific product or product time to move through each step of the cyclical lifecycle. The method may provide an estimation of time required for completion of the lifecycle. The system may further include calculating preferred or required shipping dates based on first available shipping date, least expensive shipping date, last possible shipping date, preferred carrier, least expensive carrier, carrier reliability, and/or carrier availability. The method may further include displaying the status of a product in the cyclical product lifecycle and whether an order is filled or pending with the product. The method may further include recalculating the priority of all products in the system based on material changes to the state of any on product or any one order. A material change to the state of a product or order may include delayed returns, destroyed products, delays due to maintenance or excessive cleaning, failed inspections, weather, order changes, new orders, new order delivery dates, changes in customer subscription level, or any other factor that may impact the ability of a particular product to be available to fill any particular order.

Figure 4:
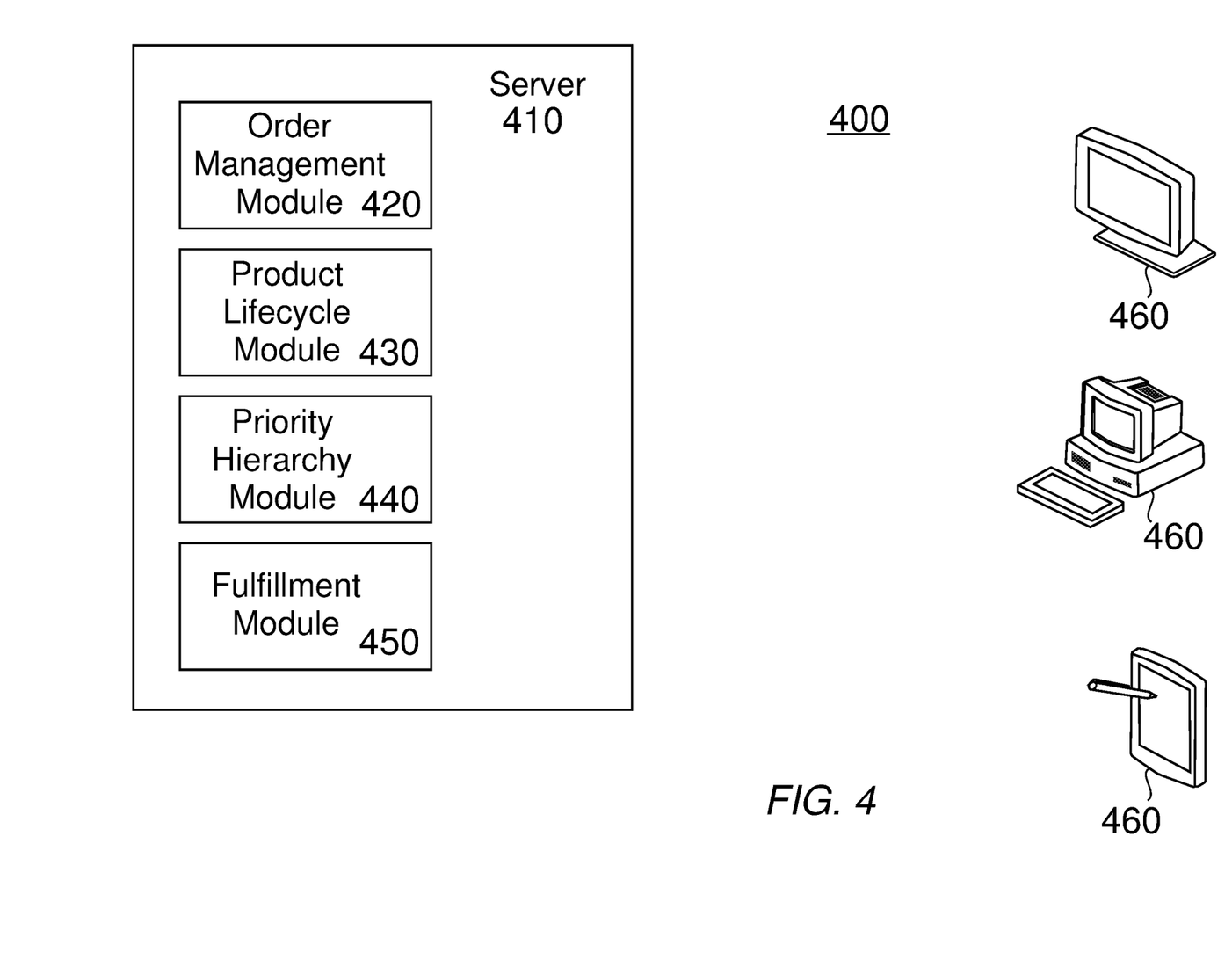
FIG. 4 is a system diagram of an example of the present invention.

FIG. 4 illustrates a system diagram of a just in-time reverse logistics system or other cyclical lifecycle management system 400. The system 400 includes a server or servers 410, wherein the server(s) 410 include an order management module 420, a product lifecycle module 430, a priority hierarchy module 440, an order fulfillment module 450; and one or more user terminals 460 to display order and product information, along with status.

The order management module 420 is configured to receive one or more product orders wherein each product is associated with an individual SKU, and provide order information to the system. Order information may include specific product information such as item or product code/SKU, size, color, style, required delivery date, and associated products. The order information may also include additional information associated with the customer including customer membership or subscription level, customer order history, delivery address, event type that the order is made (e.g., wedding, party, corporate event; vacation, etc.), marketing information such loyalty program membership, and/or payment information.

The product lifecycle module 430 is configured to track a product associated with an individual SKU through a cyclical product lifecycle, wherein the cyclical product lifecycle comprises; receiving a returned product associated with an individual SKU; presorting the returned product based on a priority hierarchy; performing maintenance on the returned product; inspecting the returned product; restocking the returned product for future sale and or including the product directly in an order assembly.

The priority hierarchy module 440 is configured for assigning priority status to products in the cyclical lifecycle based on product order information, wherein the priority hierarchy includes one or more order weighting factors comprising; date of required delivery, days required for shipment, product inventory availability, expected return date from previous sale, availability of alternative products, customer membership category, and/or customer event type.

The fulfillment module 450 is configured for matching a product order with restocked or otherwise available products for fulfilling product orders. The fulfillment module 450 may associate a product in the cyclical lifecycle with a future order and assign a priority code to the product an order to ensure that the product is processed and assembled with the order for on-time shipment. The fulfillment module 450 is also configured to calculate the desired and required times for order assembly and shipment. For example, based on the order information and product information, the fulfillment module is configured to calculate the least expensive shipping date and the last possible shipping date.

Figure 5:
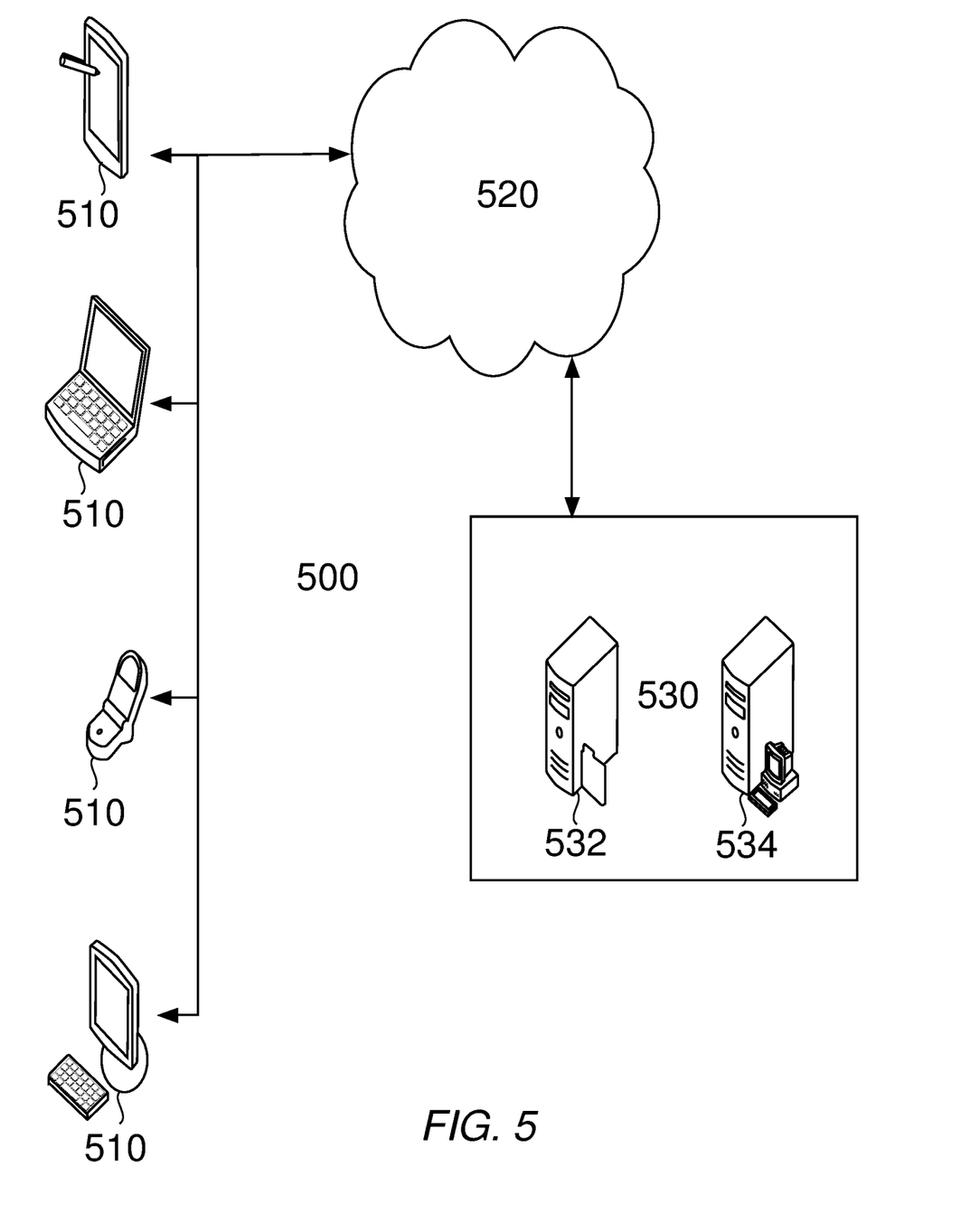
FIG. 5 is a system diagram of an example of the present invention.

With reference to FIG. 5, an illustrative system 500 for processing cyclical customer orders, such as a just-in-time reverse logistics system 110, comprises one or more user terminals 510 connected via a network 520 to a server 530 comprising a customer order module 532 and an inventory management module 534.

User terminals 510 may be any interactive user device such as a desktop, laptop, tablet, mobile device, or a purpose built device having a display and an input. Network 520 may be an open or closed network, an intranet or the Internet. The server 530 may be a single based server or a cloud based network of servers.

User terminals 510 may be associated with one or more product processing stations including product receiving; product maintenance; product storage; order assembly; order shipping. The product maintenance station may include an inspection station, a spot cleaning station, a cleaning station, a pressing station, or a repair station. In a particular example, the product processing stations are associated with the return and processing of clothing items and comprises a package receiving station, a clothing inspection station, a quality control station, a spot cleaning station, a dry cleaning station, a laundering station, a pressing station, an order assembly station, a product storage rack, and a delivery station. The return processing station may provide an input to the inventory management module that indicates the item has been returned. Any product processing station may provide an input to the inventory management module that changes the product availability, such as for example, a delay in processing for maintenance or spot cleaning.

The user terminal 510 is configured to display multiple customer orders, each order having a priority code assigned by the customer order module 532. The user display 510 is configured to display a change in multiple customer orders, wherein the change may include an addition or deletion of a customer order, or a change in priority of a customer order. For example, at each user display, a list of prioritized customer orders may be displayed. Should an order be received that has a high priority, such as a product with a same day turnaround, an indication at a product return receiving station, and each product processing station will alert the operator to apply special processing to that high priority product fill the high priority order.

The inventory management module 534 may be configured to calculate inventory availability based on one or more of the following weighted categories: product in storage; product with customer; product in delivery to customer; product in delivery from customer; product returned but not processed; product in processing; product in need of repair; product in repair, product not available; product lost; product not received on expected date; expected date of return; expected completion of product processing; availability of related products.

The inventory management module 534 is configured to receive an input from the user interface of user terminal 510 indicating a change in the inventory availability, and wherein the inventory management module is further configured to recalculate the inventory availability based on the input.

Customer order module 532 is configured to receive a first customer order for a first individual product, such as for example an order to rent a garment having a specific style, color, and size. The customer order module is further configured to receive from the inventory management module 534 an indication of inventory availability for the first individual product and calculate an order priority code for the first customer order.

The priority code is determined based on one or more of the following weighted categories: date of inventory availability, required inventory return processing time, required delivery date, shipping time, last possible ship date, earliest possible ship date, least expensive ship date; shipping cost, customer membership level, inventory category, inventory availability, or order history; assign an order priority code to the first customer order, wherein the priority code determines which order takes precedent over another order for processing; and causes an indication of the product order priority on the user display. The priority code indicates to users at processing stations what customer order should be processed first.

Customer order module 532 is further configured to receive a second customer order for a second individual product, such as a subsequent order for a garment from the same or another customer. The customer order module 532 receives from the inventory management module 534 an indication of inventory availability for the second individual product and then calculates an order priority code for the second customer order. The customer order module 532 compares the order priority code for the second customer order with the order priority code for the first customer order and recalculates the first and second order priority codes for the first and second customer orders, wherein the recalculation determines whether the first or second customer order has a higher priority.

The customer order module 532 is further configured to assign an order priority to the first and second customer orders based on the recalculation of priority codes; and cause an indication of the first and second product orders' priority on the user display of user terminals 510.

The customer order module 532 is configured to receive a change in inventory availability from the inventory management module 534 and recalculate customer order priority based in part on the change in inventory availability.

Figure 6:
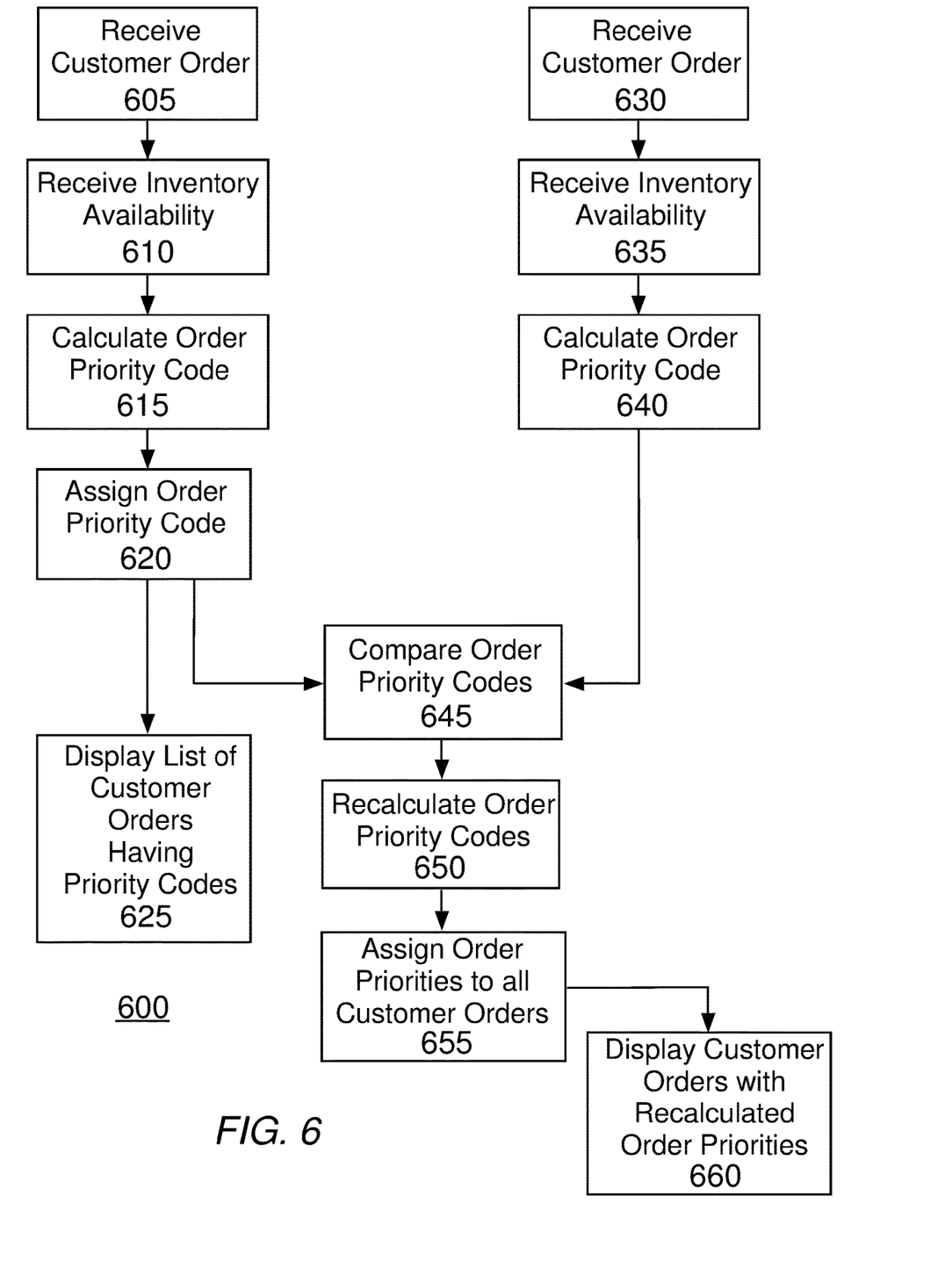
FIG. 6 is a flowchart of an example of the present invention.

With reference to FIG. 6, a computer implemented method of cyclical inventory prioritization comprises a process 600 including the steps of receiving a first customer order for a first individual product 605; receiving from an inventory management module an indication of inventory availability for the first individual product 610; calculating an order priority code for the first customer order 615; assigning an order priority code to the first customer order 620, wherein the priority code determines which order takes precedent over another order for processing; and indicating on a user display a list of two or more customer orders, each order having a priority code 625.

The priority code assigned to each customer order is determined based on one or more of the following weighted categories: date of inventory availability, required inventory return processing time, required delivery date, shipping time, last possible ship date, earliest possible ship date, least expensive ship date, shipping cost, customer membership level, inventory category, inventory availability, or order history.

The method 600 may further comprise receiving a second customer order for a second individual product 630; receiving from the inventory management module an indication of inventory availability for the second individual product 635; calculating an order priority code to the second customer order 640, comparing the order priority code for the second customer order with the order priority code for the first customer order 645: recalculating the first and second order priority codes for the first and second customer orders, wherein the recalculation determines whether the first or second customer order has a higher priority based 650; assigning an order priority to the first and second customer orders based on the recalculation of priority codes 655; and displaying on a user interface the first and second customer orders with recalculated order priorities 660.

In a practical example of the above method, a garment rental service may receive an order for a specific garment. Based on the date the garment is required the customer order module will assign a priority to the order based on the shipping time, product processing time, and other categories. If the ordered product is already out with a different customer, it may be assigned a priority code so that it is processed before other orders once the ordered product returns to the facilitated. As in the case of a same day turnaround, once the product is returned, it receives the highest priority, moving ahead of other orders through each processing stations Though specific examples of a reverse logistics system relating to rental inventory are described herein the invention is not so limited and may be equally applied to any reverse logistics system requiring inventory tracking with time sensitivity for processing and delivery. For example, the systems and methods may be equally applied to food products, live product delivery, refrigerated products, pharmaceutical and medical products, or even financial products.

The words "example" and "exemplary" used herein to mean "serving as an example, instance, or illustration." Any embodiment described herein as an "example" or "exemplary" is not necessarily to be construed as preferred or advantageous over other embodiments.

CONCLUSION

The techniques introduced herein can be implemented by, for example, programmable circuitry (e.g., one or more microprocessors) programmed with software and/or firmware, or entirely in special-purpose hardwired circuitry, or in a combination of such forms. Software or firmware for use in implementing the techniques introduced here may be stored on a machine-readable storage medium and may be executed by one or more general-purpose or special-purpose programmable microprocessors.

In addition to the above mentioned examples, various other modifications and alterations of the invention may be made without departing from the invention. Accordingly, the above disclosure is not to be considered as limiting, and the appended claims are to be interpreted as encompassing the true spirit and the entire scope of the invention.

The various embodiments are described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

A "machine-readable storage medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible storage medium includes recordable/non-recordable media (e.g., read-only memory (ROM); random access memory (RAM); magnetic disk storage media; optical storage media; flash memory devices; etc.), etc.

These computer program instructions may also be stored in a computer readable medium that can direct a computer, other programmable data processing apparatus, or other devices to function in a particular manner, such that the instructions stored in the computer readable medium produce an object of manufacture including instructions which implement the function/act specified in the flowchart and/or block diagram block or blocks.

The computer program instructions may also be loaded onto a computer, other programmable data processing apparatuses, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The aforementioned flowchart and diagrams illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

The invention claimed is:

1. A method for implementing just-in-time reverse logistics inventory management over a network on a computing system that includes a computing device having a processor associated therewith, wherein the processor includes instructions for executing the method comprising:
    mapping in real-time all reservations against an inventory of products as the products advance through a cyclical product lifecycle, wherein the cyclical product lifecycle includes any of: receiving a returned product, presorting the returned product, performing maintenance on the returned product, and restocking the returned product, matching a product order with the returned product, assembling the product order, or shipping the product order;
    receiving over the network from a user terminal a new product order associated with a reservation for one or more individual SKUs;
    establishing a priority hierarchy for the reservation against the inventory of products;
    receiving information over the network from the user terminal, wherein the received information corresponds to a receipt of a returned product associated with an individual SKU;
    assigning a priority code for the returned product based on the priority hierarchy;
    sending over the network to the user terminal the priority code by which one or more operations are performed on the returned product, the operations including any of:
        presorting the returned product based on the priority hierarchy;
        performing maintenance on the returned product as necessary;
        restocking the returned product;
        matching the new product order with the returned product;
        assembling the new product order based on the priority hierarchy; or
        shipping the new product order based on the priority hierarchy;
    wherein the mapping is recalculated anytime a material change is made to any product in the inventory of products.

2. The method of claim 1 wherein the priority hierarchy assigns a weighing factor to orders based on requirements to fill the product order, wherein the requirements include any of: date of required delivery, days required for shipment, product inventory availability, expected return date from previous sale, availability of alternative products, customer membership category, or customer event type.

3. The method of claim 1 wherein the cyclical product lifecycle includes any of:
    pre-inspecting the returned product for maintenance;
    cleaning the product;
    steaming or ironing the product;
    inspecting the product for quality control; or
    repairing the product.

4. The method of claim 1, further comprising:
    recording the step of the product lifecycle at which the returned product resides.

5. The method of claim 4, further comprising:
    providing an estimation of time until the returned product is restocked.

6. The method of claim 1 wherein assembling the new product order based on the priority hierarchy includes selecting the returned product from restocked inventory or selecting the returned product from the cyclical product lifecycle before restocking of the returned product.

7. The method of claim 1 further comprising calculating preferred shipping dates based on one or more factors comprising: product availability; least expensive shipping date; first available shipping date, last possible shipping date; bundling of orders; requested receipt date or receipt time.

8. The method of claim 1 further comprising any of:
    indicating on a display the status of the returned product in the cyclical product lifecycle, indicating the status of an order fulfillment, or indicating the status of shipment or delivery.

9. The method of claim 1 further comprising recalculating the priority hierarchy based on a change in any of: the cyclical product lifecycle, product availability, or competing orders.

10. The method of claim 9 wherein recalculation of the priority hierarchy is performed for all products in the product lifecycle simultaneously.

11. The method of claim 1 wherein the new product is order corresponds to a rental sale.

12. A system for implementing just-in-time reverse logistics management, the system comprising:

a computing device including a processor; and a mechanism for sending and receiving information between the computing device and a user terminal over a network;

wherein the processor includes instructions for executing a method comprising:

mapping in real-time all reservations against an inventory of products as the products advance through a cyclical product lifecycle, wherein the cyclical product lifecycle includes any of: receiving a returned product, presorting the returned product, performing maintenance on the returned product, and restocking the returned product, matching a product order with the returned product, assembling the product order, or shipping the product order;

receiving over the network from a user terminal a new product order associated with a reservation for one or more individual SKUs;

establishing a priority hierarchy for the reservation against the inventory of products;

receiving information over the network from the user terminal, wherein the received information corresponds to a receipt of a returned product associated with an individual SKU;

assigning a priority code for the returned product based on the priority hierarchy;

sending over the network to the user terminal the priority code by which one or more operations are performed on the returned product, the operations including and of:

presorting the returned product based on the priority hierarchy;

performing maintenance on the returned product as necessary;

inspecting the returned product;

restocking the returned product;

matching the new product order with the returned product;

assembling the new product order based on the priority hierarchy; or shipping the new product order based on the priority hierarchy;

wherein the mapping is recalculated anytime a material change is made to any product in the inventory of products.

13. The system of claim 12 wherein the processor includes instructions for recalculating product priority for all products in the system based on state changes in the cyclical product lifecycle or new product orders.

14. The system of claim 12 wherein the processor includes instructions for recalculating product priority for a chain of products associated with a state change in the product lifecycle or new product orders.

15. The system of claim 12 wherein the cyclical product lifecycle includes any of:

pre-inspecting the returned product for maintenance;

cleaning the product;

steaming or ironing the product;

inspecting the product for quality control; or repairing the product.

16. The system of claim 12, wherein the processor includes instructions for providing an indication on a display as to the priority and status of a product order and/or product position within the product lifecycle.

17. The system of claim 16, wherein the processor includes instructions for indicating the order priority and/or product status based on a color scheme on the display.

18. The system of claim 16, wherein the processor includes instructions for recalculating the priority of an order and/or product based on a state change to any product in the system and the displayed priority and status of an order and/or product is refreshed after the recalculation.

19. The system of claim 12, wherein the processor includes instructions for recording and/or calculating critical dates including preferred shipping dates based on one or more factors comprising any of: product availability; least expensive shipping date; first available shipping date, last possible shipping date; bundling of orders; requested receipt date or receipt time.

20. The system of claim 12 wherein the new product order corresponds to a rental sale.

* * * * *